Jan. 27, 1942.    R. I. GEIGER    2,271,335
REEL CLIP
Original Filed May 31, 1939
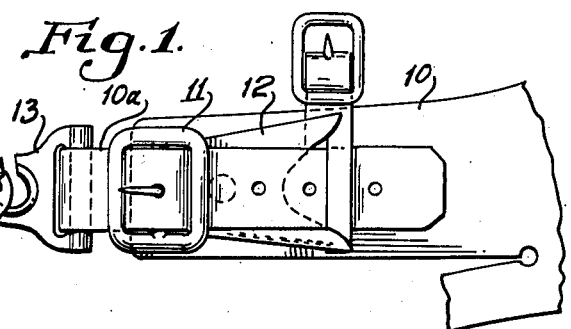
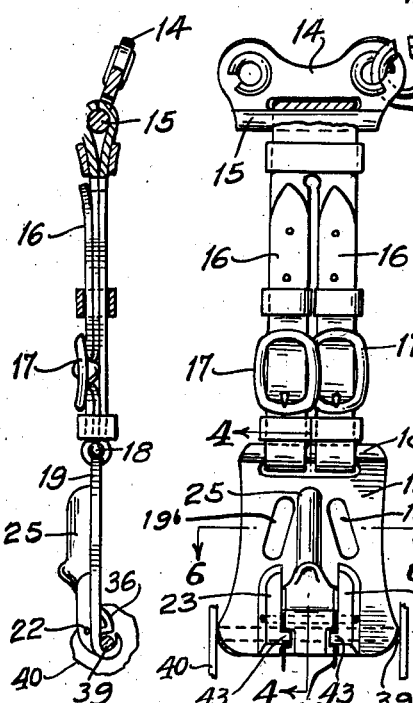
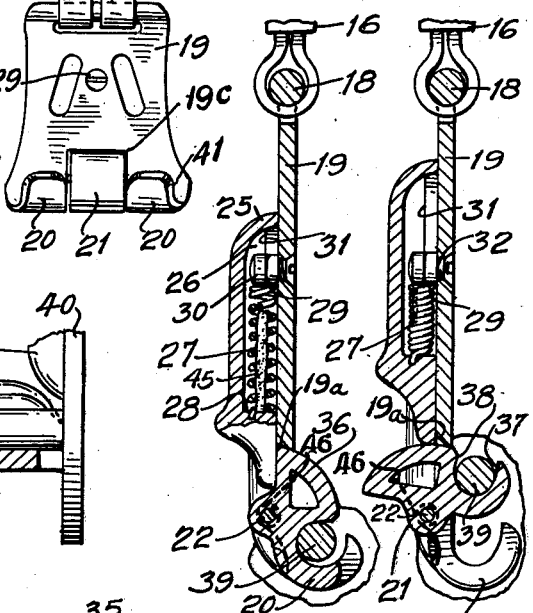
INVENTOR.
RALPH I. GEIGER
BY C. Lauren Maloby
ATTORNEY.

Patented Jan. 27, 1942

2,271,335

UNITED STATES PATENT OFFICE 2,271,335

REEL CLIP

Ralph I. Geiger, Los Angeles, Calif.

Original application May 31, 1939, Serial No. 276,605. Divided and this application January 25, 1940, Serial No. 315,572

10 Claims. (Cl. 24—241)

This invention relates to fishing equipment and accessories and more especially to a safety self-locking reel clamp.

This application is a division of my previously filed application, Serial No. 276,605, filed May 31, 1939.

An object of the invention is to provide a simple, practical and efficient locking reel clamp for attachment to a fisherman's harness.

Another object is to provide a clamp with a novel quick release safety lock for a fisherman's reel.

A further object is to provide a quick release automatic safety lock clamp adapted for ready attachment to many types of rods and bars and which may be quickly released.

Other objects and advantages will appear and be brought out more fully in the following specification, reference being had to the accompanying drawing, wherein:

Fig. 1 is a face view of a reel clamp embodying my invention showing typical connection to a fisherman's harness;

Fig. 2 is an edge view of the same;

Fig. 3 is a back view of the clamp shown in Fig. 1;

Fig. 4 is a sectional view taken along the line 4—4 of Fig. 1;

Fig. 5 is a view similar to Fig. 4 with the latch shown in open position;

Fig. 6 is a sectional view taken along the line 6—6 of Fig. 1;

Fig. 7 is a perspective view of the slidable locking member and the lock pin; and Fig. 8 is a perspective view of the counterbalanced latch member.

Referring more particularly to the drawing, I show a belt hitch portion 10 of a fisherman's harness such as shown and described fully in my parent application above referred to, a belt hitch portion 10a being suitably secured to hitch portion 10 and having a buckle 11 secured to hitch portion 10 by a hitch portion 12. A hook member 13 is held by belt portion 10a and is one of a pair of similar members which secure and support a plate 14 which is provided with a pin portion 15 to which is secured a one piece or a divided adjustable strap 16 provided with the usual buckle or buckles 17.

Strap members 16 are passed around a pin portion 18 of a reel clip 19 which comprises a plate member having a pair of lip portions 20, the plate being slotted 19c to receive a pivoted latch member 21 carried by or having a bearing pin 22, the end portions of which are carried by a pair of bosses 23 on the opposite face of plate 19 from lips 20. Bosses 23 have inclined undercut faces 24 forming ways for a slidable locking member 25 having a recess 26 provided for a spring 27, there being a shoulder 28 in recess 26 for one end of the spring, the other end of which is held against a pin 29 which extends through plate 19. Pin 29 has a shouldered head 30 which is narrowed at the sides to permit entrance into recess 26, and the pin is turned crosswise in the recess such that the shouldered head 30 engages a pair of undercut shoulders 31 of member 25 so as to retain the latter against plate 19.

Pin 29 in the form shown in Fig. 7, after being inserted in a threaded aperture 32 in plate 19 and turned a quarter turn, is spread and locked down as shown in Figs. 5 and 6 so as to be permanently held in position. Member 25 has a flat surface portion 33 and an edge portion 34 transverse thereof. Latch member 21 has a flat surface portion 35 for engagement with the face portion 33, and a curved portion 36 for engagement with edge 34 of member 25, and in closed position with beveled edge 19a of plate 19. Friction and spring 27 hold member 21 in open position until closed by bar 39. Member 21 has a curved portion 37 and a curved butt portion 38 for securing a cross bar 39 of a reel 40.

As may be seen from Figs. 4 and 5, reel cross bar 39 may be placed in the curved portion 37 of member 21 and pressed downwardly which causes the latch member to pivot to the position shown in Fig. 4 whereupon member 25 will be urged downwardly by spring 27 causing edge 34 to pass over surface 36, and surface 33 to engage surface 35, thus locking member 21, and bar 39 will be held by lips 20 and abutment surface 38. Thus the reel is securely held to the clip but may be readily released by withdrawing slide member 25 by simple manipulation of the thumb or fingers and freeing counterbalanced member 21 which will open in the reverse manner. The extreme width of the pair of lips 20 is less than the maximum width of plate 19 and the outer ends of lips 20 are chamfered at 41 to provide clearance for a reel spool 42 as may be clearly seen in Figs. 3 and 6. Bosses 23 each have an inwardly extending lug 43, and member 21 has a pair of recessed abutments 44 which engage lugs 43 and with edge 19a limit the rotation of member 21 to the position shown in Fig. 4.

Spring 27 is provided with an oil wick 45 which provides lubrication for locking member 25. Plate 19 is provided with apertures 19b through which the line and reel spool may be watched, Member 21 is counterbalanced to open of its own weight when plate 19 is substantially horizontal as shown in Fig. 6. However, a suitable spring 46 may be provided to open member 21 whenever it is released from locking member 25.

Having described my invention, what I claim is:

1. A quick release safety reel clip for a fisherman's harness hitch as described, comprising a plate member having a lock element having an elongated reel cross bar retaining lip portion, a pivoted latch member on said plate member having a reel cross bar engaging portion, and a slide engaging portion, a retractable slide member adapted to engage said latch slide portion, and be retracted therefrom, and a spring connected to said slide and plate whereby to effect said slide and lock engagement.

2. A quick release safety reel clip for a fisherman's harness hitch as described, comprising a plate member having retaining lip portions adapted to engage and extend along a reel cross bar, a latching member on said plate member adapted to lock said cross bar to said lip portions, said lip portions having tapered and chamfered edges whereby to provide clearance for the reel spool.

3. A quick release safety reel clip for a fisherman's harness hitch as described, comprising a plate member having a reel cross bar engaging portion extending substantially the length of said bar, and a retractable latch member on said plate member for said cross bar, said plate having an aperture to permit visibility of said reel spool therethrough.

4. A quick release safety clip as described, comprising a plate member having a plurality of spaced lip portions adapted to engage a cross bar, a counterbalanced latch member pivotally mounted between said clip portions, and a retractable locking member on said plate member adapted to engage and lock said latch member.

5. A quick release safety clip as described, comprising a plate member having a plurality of spaced lip portions adapted to engage a cross bar, a counterbalanced latch member pivotally mounted between said lip portions, and a retractable locking member on said plate member adapted to engage and lock said latch member, said latch member adapted to automatically open and be retained in open position when said locking member is retracted.

6. A quick release safety clip as described, comprising a plate member having a plurality of spaced lip portions adapted to engage a cross bar, a counterbalanced latch member pivotally mounted between said lip portions and a retractable locking member on said plate member adapted to engage and lock said latch member, said latch member adapted to automatically close and lock when pivoted to the closed position by a rod or bar.

7. A quick release safety clip as described, comprising a plate member having a plurality of spaced lip portions adapted to engage a cross bar, a counterbalanced latch member pivotally mounted between said lip portions, and a retractable locking member on said plate member adapted to engage and lock said latch member, said latch member adapted to be released by the retraction of said locking member.

8. A quick release safety clip as described, comprising a plate member having a plurality of spaced lip portions adapted to engage a cross bar, a counterbalanced latch member pivotally mounted between said lip portions, and a retractable locking member on said plate member adapted to engage and lock said latch member, said plate member and latch member having interengaging abutments adapted to limit the pivotal movement of said latch member.

9. A quick release safety clip as described, comprising a plate member having a plurality of spaced lip portions adapted to engage a cross bar, a counter-balanced bar latching member pivotally mounted between said lip portions, a spring adapted to bias said latching member in unlocked position, and a retractable locking member on said plate member adapted to engage and lock said latching member in locked position, said plate member and latching member having interengaging abutments adapted to limit the pivotal movement of said latching member in locked and unlocked positions.

10. A quick release safety clip as described comprising a body member having a lip portion adapted to engage a transverse bar section and having a slot intermediate the lateral edges thereof and adjacent said lip portion, a counter-balance bar latching member pivotally mounted in said slot having a bar engaging hook and an abutment portion, a spring to open said latching member, a retractable locking element on said body member adapted to engage and lock said latching member when said bar has actuated said hook portion said latching member adapted to automatically release said bar when said locking member has been retracted.

RALPH I. GEIGER.